United States Patent
Liu et al.

(10) Patent No.: US 8,343,622 B2
(45) Date of Patent: Jan. 1, 2013

(54) FLEXIBLE HIGH REFRACTIVE INDEX HARDCOAT

(75) Inventors: Lan H. Liu, Rosemount, MN (US); Robert F. Kamrath, Mahtomedi, MN (US); Encai Hao, Woodbury, MN (US); Taun L. McKenzie, Hugo, MN (US); Marc D. Radcliffe, Newport, MN (US); Richard J. Pokorny, Maplewood, MN (US); Christopher B. Walker, Jr., St. Paul, MN (US); Anthony M. Renstrom, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1079 days.

(21) Appl. No.: 12/165,765

(22) Filed: Jul. 1, 2008

(65) Prior Publication Data

US 2010/0003501 A1 Jan. 7, 2010

(51) Int. Cl.
- *B32B 5/16* (2006.01)
- *B32B 27/32* (2006.01)
- *B32B 27/00* (2006.01)

(52) U.S. Cl. ........ 428/323; 428/220; 428/327; 428/332; 428/336; 428/405; 428/500

(58) Field of Classification Search ..................... None
See application file for complete search history.

(56) References Cited

U.S. PATENT DOCUMENTS

| | | | |
|---|---|---|---|
| 6,132,861 A | 10/2000 | Kang et al. |
| 6,238,798 B1 | 5/2001 | Kang et al. |
| 6,245,833 B1 | 6/2001 | Kang et al. |
| 6,299,799 B1 | 10/2001 | Craig et al. |
| 6,376,590 B2 | 4/2002 | Kolb et al. |
| 7,170,684 B2 | 1/2007 | Fukuda et al. |
| 7,264,872 B2 | 9/2007 | Walker, Jr. et al. |
| 7,323,514 B2 | 1/2008 | Jing et al. |
| 2006/0147674 A1 | 7/2006 | Walker, Jr. et al. |
| 2006/0148996 A1 | 7/2006 | Coggio et al. |
| 2006/0204745 A1 | 9/2006 | Jones et al. |
| 2007/0286993 A1 | 12/2007 | Radcliffe et al. |
| 2007/0286994 A1 | 12/2007 | Walker et al. |
| 2008/0030829 A1 | 2/2008 | Jones et al. |
| 2008/0050560 A1 | 2/2008 | Jones et al. |
| 2008/0221291 A1 | 9/2008 | Invie et al. |

FOREIGN PATENT DOCUMENTS

| CN | 1347432 | 5/2002 |
|---|---|---|
| WO | WO 00/47666 | 8/2000 |
| WO | WO 2008/121465 | 10/2008 |

OTHER PUBLICATIONS

U.S. Appl. No. 11/744,318, filed May 4, 2007.
PCT/US2008/074988, filed Sep. 2, 2008.
PCT/US2008/055058, filed Feb. 27, 2008.

*Primary Examiner* — Sheeba Ahmed
(74) *Attorney, Agent, or Firm* — Carolyn A. Fischer

(57) ABSTRACT

Antireflective films comprising a flexible high refractive index layer that comprises at least 60 wt-% of inorganic nanoparticles, the nanoparticles having a refractive index of at least 1.60, dispersed in a crosslinked organic material. Also described are surface treated nanoparticles.

28 Claims, No Drawings

FLEXIBLE HIGH REFRACTIVE INDEX HARDCOAT

BACKGROUND

AR films are often constructed of alternating high and low refractive index ("RI") polymer layers of the correct optical thickness. With regards to visible light, this thickness is on the order of one-quarter of the wavelength of the light to be reflected. The human eye is most sensitive to light around 550 nm. Therefore it is desirable to design the low and high index coating thicknesses in a manner that minimizes the amount of reflected light in this optical range (e.g. 2.5% or lower).

U.S. Pat. No. 7,264,872 describes a durable high index nanocomposite for antireflective coatings. The high refractive nanocomposite comprises surface modified inorganic nanoparticles, such as zirconia, dispersed in a crosslinked organic material.

SUMMARY

In some embodiments, antireflective films are described. The antireflective films comprise a high refractive index layer that comprises at least 60 wt-% of inorganic nanoparticles having a refractive index of at least 1.60 dispersed in a crosslinked organic material.

In one embodiment, an antireflective film is described comprising a light transmissive substrate having a thickness ranging from about 20 to 200 microns; a high refractive index layer having a thickness ranging from about 3 to 5 microns disposed on the substrate, and a low refractive index surface layer coupled to the high refractive index layer. The high refractive index layer does not crack when testing according to ISO 1519 using a mandrel size of 6 mm.

In another embodiment, an antireflective film is described comprising a high refractive index layer coupled to the low refractive index layer, wherein the high refractive index layer comprises the reaction product of a polymerizable resin composition comprising at least one di(meth)acrylate monomer and/or oligomer comprising at least two aromatic rings in an amount of at least 11 wt-% solids.

In another embodiment, an antireflective film is described comprising a high refractive index layer coupled to the low refractive index layer wherein the inorganic nanoparticles (i.e. of the high refractive index layer) comprise a first surface treatment that copolymerizes with the organic material, a second surface treatment having a non-reactive compatibilizing group, and the first surface treatment and second surface treatment are present at a molar ratio of at least 5:1.

Also described are surface modified inorganic nanoparticles having a refractive index of at least 1.60 as well as polymerizable resin compositions comprising such nanoparticles. The nanoparticles comprise a first (meth)acryl silane surface treatment and a second non reactive silane surface treatment and the molar ratio of the first surface treatment to the second is at least 5:1.

DETAILED DESCRIPTION OF PREFERRED EMBODIMENTS OF THE INVENTION

Presently described are antireflective film articles comprising a flexible high refractive index hardcoats. The antireflective films articles comprise a low refractive index (e.g. surface) layer coupled to a high refractive index hardcoat layer.

The high refractive index layer has a refractive index of at least about 1.60, 1.61, 1.62, 1.63, 1.64, 1.65, 1.66, or 1.67. The refractive index of the high index layer is typically no greater than about 1.75 for coatings having high refractive index inorganic nanoparticles dispersed in a crosslinked organic material. The low refractive index layer has a refractive index less than a high refractive index layer. The difference in refractive index between the high refractive index layer and low refractive index layer is typically at least 0.10, or 0.15, or 0.2 or greater. The low refractive index layer typically has a refractive index of less than about 1.5, more typically of less than about 1.45, and even more typically less than about 1.42. The minimum refractive index of the low index layer is generally at least about 1.35. Preferably, the refractive index of the low refractive index layer is about equal to the square root of the refractive index of the high refractive index layer.

Antireflective films typically have an average reflectance of less than 3%, 2%, or 1% at 450 nm to 650 nm as measured with a spectrophotometer as described in the examples.

Durable antireflective films preferably comprise a relatively thick high refractive index layer in combination with a relatively thin low refractive index layer. The high refractive index layer typically has a thickness of at least 2 microns and typically no greater than 6 microns. The low refractive index layer has an optical thickness of about ¼ wave. Such thickness is typically less than 0.5 microns, more typically less than about 0.2 microns and often about 90 nm to 110 nm. When a durable high refractive index layer is employed in combination with a durable low refractive index layer, a durable (e.g. two-layer) antireflective film can be provided in the absence of additional hardcoat layers.

In yet another embodiment, both the low refractive index layer and high refractive index hardcoat layer described herein may be relatively thin, each layer being at least about 50 nm and less than 0.5 microns (e.g. less than 0.2 microns). For this embodiment, the durable antireflective film article comprises an additional hardcoat layer between the substrate and the high index layer, such as described in U.S. Pat. No. 7,323,514. The additional hardcoat layer contains (e.g. surface modified silica) nanoparticles dispersed in an organic matrix such as described in U.S. Pat. Nos. 6,132,861 (Kang et al. '861), 6,238,798 B1 (Kang et al. '798), 6,245,833 B1 (Kang et al. '833) and 6,299,799 (Craig et al. '799).

The high refractive index hardcoat and antireflective films described herein are preferably durable. In one aspect, the durable antireflective films resist scratching after repeated contact with an abrasive material such as steel wool. The presence of significant scratching can increase the haze of the antireflective film. In one embodiment, the antireflective film has a haze of less than 1.0% after 25, 50, or 100 wipes with steel wool using a 3.2 cm diameter mandrel and a mass of 1000 g, according to the Steel Wool Durability Test as further described in the examples.

Surface layers that resist visible scratching do not necessary retain their low surface energy. In preferred embodiments, the antireflective films also retain low surface energy after repeated contact with an abrasive material such as steel wool. In preferred embodiments, the antireflective film preferably exhibits an advancing contact angle with hexadecane of at least 45°, 50°, or 60° after 5, 10, 15, 20, or 25 wipes with steel wool using a 3.8 cm diameter mandrel and a mass of 1000 grams, according to the Steel Wool Durability Testing. The antireflective film typically also exhibits a static contact angle with water of at least 90°, 95°, or 100° after 10 wipes, 50 wipes, 100 wipes, 200 wipes, or even 300 wipes with steel wool using a 3.8 cm diameter mandrel and a mass of 500 grams.

The low and high refractive index layer each comprise the reaction product of free-radically polymerizable materials.

The free-radically polymerizable material will be described herein with respect to (meth)acrylate materials. However, similar results can be obtained by the use of other free-radically polymerizable groups, as known in the art.

The presently described hardcoat compositions comprise a relatively high concentration of high refractive index inorganic nanoparticles dispersed in a crosslinked organic material. The concentration of inorganic nanoparticles in the crosslinked high refractive index hardcoat can be at least 60, 65, 70, 75, 80 wt-% solids of the cured high refractive index hardcoat. Hence, the concentration of free-radically polymerizable organic components (i.e. including the nanoparticle surface treatments) is typically at least 20 wt-% and no greater than 40 wt-% solids. In preferred embodiments, the concentration of inorganic nanoparticles in the crosslinked high refractive index hardcoat ranges from 60 to 70 wt-%.

Various high refractive index nanoparticles are known, including for example zirconia ("ZrO$_2$"), titania ("TiO$_2$"), antimony oxides, alumina, tin oxides, alone or in combination. Mixed metal oxide may also be employed. Such materials have a refractive index of at least 1.60, 1.65, 1.70, 1.75, 1.80, 1.85, 1.90, 1.95, 2.00 or higher.

Zirconias for use in the high refractive index layer are available from Nalco Chemical Co. under the trade designation "Nalco OOSSOO8", Buhler AG Uzwil, Switzerland under the trade designation "Buhler zirconia Z-WO sol" and Nissan Chemical America Corporation under the trade name NanoUse ZR™. Zirconia nanoparticles can also be prepared such as described in U.S. Patent Publication No. 2006/0148950 and U.S. Pat. No. 6,376,590. A nanoparticle dispersion that comprises a mixture of tin oxide and zirconia covered by antimony oxide (RI~1.9) is commercially available from Nissan Chemical America Corporation under the trade designation "HX-05M5". A tin oxide nanoparticle dispersion (RI~2.0) is commercially available from Nissan Chemicals Corp. under the trade designation "CX-S401M".

Even though the hardcoat composition comprises a relatively high concentration of inorganic nanoparticles, in preferred embodiments the cured hardcoat layer is flexible. In some embodiments, the high refractive index layer is sufficiently "flexible" such that a 3 to 5 micron cured layer of the high refractive index hardcoat does not crack when tested according to ISO 1519 using a mandrel size of 6 mm. Typically, the low refractive index layer and optional light transmissive film are at least as flexible as the high refractive index hardcoat. In such embodiments, these coupled layers also do not crack when tested according to ISO 1519 using a mandrel size of 6 mm.

A variety of free-radically polymerizable monomers, oligomers, polymers, and mixtures thereof can be employed in the organic material of the high refractive index layer. The free-radically polymerizable monomers, oligomers, polymers may optionally contain sulfur or bromine atoms for the purpose of raising the refractive index of the organic material.

In some embodiments, the improvement is flexibility is provided solely or in part by the inclusion of at least 11, 12, or 13 wt-% of di(meth)acrylate) monomer(s) and/or oligomer(s) comprising at least two aromatic rings. In some embodiments, the ratio of inorganic nanoparticles to di(meth)acrylate) monomer(s) and/or oligomer(s) comprising at least two aromatic rings is no greater than 6.5 to 1. Such aromatic monomer typically comprises a molecular weight of at least 350 g/mole, 400 g/mole, or 450 g/mole. The aromatic monomer or oligomer having at least two polymerizable (meth) acrylate groups may be synthesized or purchased. The aromatic monomer or oligomer typically contains a major portion, i.e. at least 60-70 wt-%, of a specific structure. It is commonly appreciated that other reaction products are also typically present as a byproduct of the synthesis of such monomers.

In some embodiments, the polymerizable composition comprises at least one di(meth)acrylate monomer that comprises a major portion of the following general structure:

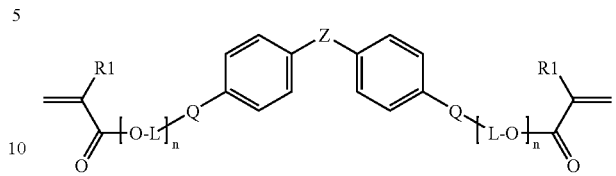

wherein Z is independently —C(CH$_3$)$_2$—, —CH$_2$—, —C(O)—, —S—, —S(O)—, or —S(O)$_2$—, each Q is independently O or S. L is a linking group. L may independently comprise a branched or linear C$_2$-C$_{12}$ alkylene group and n ranges from 0 to 10. L preferably comprises a branched or linear C$_2$-C$_6$ alkyene group. More preferably L is C$_2$ or C$_3$ and n is 0, 1, 2 or 3. Typically, the linking groups are the same. R1 is independently hydrogen or methyl.

In some embodiments, the aromatic monomer is a bisphenol di(meth)acrylate, i.e. the reaction product of a bisphenol A diglycidyl ether and acrylic acid. Although bisphenol A diglycidyl ether is generally more widely available, it is appreciated that other biphenol diglycidyl ether such as bisphenol F diglycidyl ether could also be employed.

The aromatic monomer is preferably a bisphenol A ethoxylated diacrylate. One exemplary bisphenol A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.).

Alternatively or in addition to, the organic component may comprise one or more (meth)acrylated aromatic epoxy oligomers. Various (meth)acrylated aromatic epoxy oligomers are commercially available. For example, (meth)acrylated aromatic epoxy, (described as a modified epoxy acrylates), are available from Sartomer, Exton, Pa. under the trade designation "CN118", and "CN115". (Meth)acrylated aromatic epoxy oligomer, (described as an epoxy acrylate oligomer), is available from Sartomer under the trade designation "CN2204". Further, a (meth)acrylated aromatic epoxy oligomer, (described as an epoxy novolak acrylate blended with 40% trimethylolpropane triacrylate), is available from Sartomer under the trade designation "CN112C60". One exemplary aromatic epoxy acrylate is commercially available from Sartomer under the trade designation "CN 120" (reported by the supplier to have a refractive index of 1.5556, a viscosity of 2150 at 65° C., and a Tg of 60° C.).

In some embodiments, the polymerizable resin composition comprises at least one biphenyl di(meth)acrylate monomer that comprises a major portion having the following general structure:

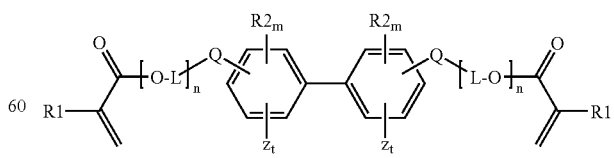

wherein each R1 is independently H or methyl;
each R2 is independently Br;
m ranges from 0 to 4;
each Q is independently O or S;

n ranges from 0 to 10;

L is a C2 to C12 alkylene group optionally substituted with one or more hydroxyl groups;

z is an aromatic ring; and t is independently 0 or 1.

In some aspects, Q is preferably O. L may independently comprise a branched or linear $C_2$-$C_{12}$ alkylene group and n ranges from 0 to 10. L preferably comprises a branched or linear $C_2$-$C_6$ alkylene group. More preferably L is $C_2$ or $C_3$ and n is 1, 2 or 3. Typically, the linking groups are the same. R1 is independently hydrogen or methyl. In some embodiments, z is preferably fused to the phenyl group thereby forming a binaphthyl core structure.

Preferably, at least one of the -Q[L-O]n C(O)C(R1)=$CH_2$ groups is substituted at the ortho or meta position. More preferably, the biphenyl di(meth)acrylate monomer comprises a sufficient amount of ortho and/or meta(meth)acrylate substituents such that the monomer is a liquid at 25° C. In some embodiments, each (meth)acrylate group containing substituent is bonded to an aromatic ring group at an ortho or meta position. It is preferred that the biphenyl di(meth)acrylate monomer comprises a major amount of ortho(meth)acrylate substituents (i.e. at least 50%, 60%, 70%, 80%, 90%, or 95% of the substituents of the biphenyl di(meth)acrylate monomer). In some embodiments, each (meth)acrylate group containing substituent is bonded to an aromatic ring group at an ortho or meta position. As the number of meta- and particularly para-substituents increases, the viscosity of the organic components can increase as well. Further, para-biphenyl di(meth)acrylate monomers are solids at room temperature, with little solubility (i.e. less than 10%), even in phenoxyethyl acrylate and tetrahydrofurfuryl acrylate.

Such biphenyl monomers are described in further detail in 60/893,953, filed Mar. 9, 2007. Other biphenyl di(meth)acrylate monomer are described in the literature.

Alternatively, the improvement in flexibility can be provided solely or in part by surface modifying the inorganic nanoparticles with certain combinations of surface treatments, as will subsequently be described. When the inorganic nanoparticles comprises such combinations of surface treatments, the organic component may consist entirely of one or more free-radically polymerizable crosslinkers having three or more (meth)acrylate groups. The concentration of crosslinker can ranges from about 10 to about 25 wt-%. In the absence of such combination of surface treatments, it is preferred that the organic component is substantially free of crosslinkers having three or more (meth)acrylate groups. In some embodiments, the high refractive index layer comprises certain (e.g. alkoxylated) di(meth)acrylate monomer and oligomers and the inorganic nanoparticles comprises certain combinations of surface treatments.

Suitable free-radically polymerizable crosslinkers include for example trimethylolpropane triacrylate (commercially available from Sartomer Company, Exton, Pa. under the trade designation "SR351"), ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494"), dipentaerythritol hexaacrylate, and tris(2-hydroxyethyl)isocyanurate triacrylate (from Sartomer under the trade designation "SR368"). In some aspects, a hydantoin moiety-containing multi-(meth)acrylates compound, such as described in U.S. Pat. No. 4,262,072 (Wendling et al.) is employed.

In some embodiments, the inorganic nanoparticles comprise a first non-reactive surface treatment comprising at least one compatibilizing group. By "non-reactive" it is meant that the compatibilizing group does not react with the organic component. The second surface treatment comprises at least one reactive group that copolymerizes with the organic component. The combination of surface treatments are employed in amounts such that the nanoparticles comprise a major amount of the copolymerizable surface treatment. Accordingly, the stoichiometric (i.e. molar) amount of the copolymerizable surface treatment is greater than the non-reactive compatibilizing surface treatment. For example, the molar ratio of copolymerizable surface treatment to non-reactive surface treatment may be 1.1:1 or 1.5:1 or 2:1 or 3:1 or 4:1. In preferred embodiments, the molar ratio of copolymerizable surface treatment to non-reactive surface treatment is at least 5:1, 6:1, or 7:1 and more preferably, 8:1, 9:1, or 10:1.

In some embodiments, at least one (meth)acryl silane is employed as the copolymerizable surface treatment. Suitable (meth)acryl silanes include (meth)acryloy alkoxy silanes such as 3-(methacryloyloxy)propyltrimethoxysilane, 3- acryloyloxypropyltrimethoxysilane, 3-(methacryloyloxy)propylmethyldimethoxysilane, 3-(acryloyloxypropyl)methyldimethoxysilane, 3-(methacryloyloxy) propyldimethylmethoxysilane, and 3-(acryloyloxypropyl) dimethylmethoxysilane. Of these, the (meth)acryl silanes tend to provide better flexibility in comparison to the acryl silanes.

In other embodiments, the copolymerizable surface treatment comprises at least one (e.g. non-volatile) monocarboxylic acid. "Non-volatile acid" refers to monocarboxylic acids having more than six carbon atoms. Examples of surface modification agents of this type are succinic acid mono-(2-acryloyloxy-ethyl) ester, maleic acid mono-(2-acryloyloxy-ethyl) ester, and glutaric acid mono-(2-acryloyloxy-ethyl) ester, maleic acid mono-(4-acryloyloxy-butyl) ester, succinic acid mono-(4-acryloyloxy-butyl) ester, glutaric acid mono-(4-acryloyloxy-butyl) ester. Other surface modifiers of this type include mono(meth)acryloxypolyethyleneglycol succinate, and analogous materials made from maleic or glutaric anhydride.

The non-reactive surface treatment comprises a non-reactive compatibilizing group. Such compatibilizing group preferably comprises a polar-group such as a (e.g. polyether group) water soluble tail. Such surface treatment can impart polar character to the high refractive index nanoparticles.

The polyether tail comprises repeating difunctional alkoxy radicals having the general formula —O—R—. Preferred R groups have the general formula —$C_nH_{2n}$— and include, for example, methylene, ethylene and propylene (including n-propylene and i-propylene) or a combination thereof. Combinations of R groups may be provided, for example, as random, or block type copolymers.

In some embodiments, particularly in combination with a (meth)acryl silane copolymerizable surface treatment, the non-reactive compatibilizing surface treatment is preferably a silane having a polyether tail, such as commercially available from GE Silicone, under the trade designation "Silquest A-1230".

In some embodiments, particularly in combination with a copolymerizable (e.g. non-volatile) monocarboxylic acid surface treatment, the non-reactive surface treatment is a monocarboxylic acid (i.e., containing one carboxylic acid group per molecule) having a polyether tail such as represented by the following formula:

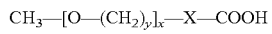

CH$_3$—[O—(CH$_2$)$_y$]$_x$—X—COOH wherein
X is a divalent organic linking group;
x ranges from about 1-10; and
y ranges from about 1-4.
Representative examples of X include —X$_2$—(CH$_2$)$_n$— where X$_2$ is —O—S—, —C(O)O—, —C(O)NH— and wherein n ranges from about 1-3.

Examples of preferred polyether carboxylic acids include 2-[2-(2-methoxyethoxy)ethoxy]acetic acid having the chemical structure CH$_3$O(CH$_2$CH$_2$O)$_2$CH$_2$COOH (hereafter MEEAA) and 2-(2-methoxyethoxy)acetic acid having the chemical structure CH$_3$OCH$_2$CH$_2$OCH$_2$COOH (hereafter MEAA). MEAA and MEEAA are commercially from Aldrich Chemical Co., Milwaukee, Wis. as catalog numbers 40,701-1 and 40,700-3, respectively.

Other surface modifiers with polyether compatibilizing tails include those generally prepared by the reaction of an aliphatic anhydride and a polyalkylene oxide monoether. Surface modifiers of this type include succinic acid mono-[2-(2-methoxy-ethoxy)-ethyl]ester, maleic acid mono-[2-(2-methoxy-ethoxy)-ethyl]ester, and glutaric acid mono-[2-(2-methoxy-ethoxy)-ethyl]ester.

Copolymerizable surface treatments and/or non-reactive compatibilizing surface treatments with a relatively high refractive index (e.g. RI is at least 1.50) can also be utilized. Compatibilizers containing one or more aromatic groups, such as phthalate groups, advantageously have a high refractive index and thus the inclusion of such can raise the refractive index of the overall polymerizable composition. The inclusion of sulfur or bromine atoms in the surface modifier molecules can also raise the refractive index. Various phthalate based material can be produced such as described in US2007/70112097; incorporated herein by reference.

The size of inorganic particles is chosen to avoid significant visible light scattering. It may be desirable to employ a mixture of inorganic oxide particle types to optimize an optical or material property and to lower total composition cost. The surface modified colloidal nanoparticles can be oxide particles having a (e.g. unassociated) primary particle size or associated particle size of at least 1 nm or 5 nm. The primary or associated particle size is generally less than 100 nm, 75 nm, or 50 nm. Typically the primary or associated particle size is less than 40 nm, 30 nm, or 20 nm. It is preferred that the nanoparticles are unassociated. Their measurements can be based on transmission electron miscroscopy (TEM). Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The surface modification of the particles in the colloidal dispersion can be accomplished in a variety known ways, such as described in previously cited Published U.S. Patent Application No. 2006/0148950 and U.S. Pat. No. 6,376,590.

The surface modified particles can then be incorporated into the curable (i.e. polymerizable) resin compositions by various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying. In another aspect, the surface modified particles can be extracted into a water immiscible solvent followed by solvent exchange, if so desired. Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The low refractive index composition comprises the reaction product of a polymerizable low refractive index composition comprising at least one fluorinated or silicone-containing free-radically polymerizable material and surface modified inorganic nanoparticles. The surface modified particles preferably having a low refractive index (e.g. less than 1.50) dispersed in a free-radically polymerized fluorinated organic material described herein. Various low refractive index inorganic particles are known such as metal oxides, metal nitrides, and metal halides (e.g. fluorides). Preferred low refractive index particles include colloidal silica, magnesium fluoride, and lithium fluoride.

Aqueous colloidal silicas dispersions for use in the low refractive index composition are commercially available from Nalco Chemical Co., Naperville, Ill. under the trade designation "Nalco Collodial Silicas" such as products 1040, 1042, 1050, 1060, 2327 and 2329 or Nissan Chemical America Corporation, Houston, Tex. under the trade name Snowtex™. Organic dispersions of colloidal silicas are commercially available from Nissan Chemical under the trade name Organosilicasol™. Suitable fumed silicas include for example, products commercially available from DeGussa AG, (Hanau, Germany) under the trade designation, "Aerosil series OX-50", as well as product numbers -130, -150, and -200. Fumed silicas are also commercially available from Cabot Corp., Tuscola, Ill., under the trade designations CAB-O-SPERSE 2095", "CAB-O-SPERSE A105", and "CAB-O-SIL M5".

The concentration of (e.g. inorganic) nanoparticles in the low refractive index layer is typically at least 5 vol-%, and preferably at least 15 vol-%. The concentration of inorganic particle is typically no greater than about 50 vol-%, and more preferably no greater than 40 vol-%.

The fluorinated or silicone-containing component(s) of the low refractive index layer provide low surface energy. The surface energy of the low index coating composition can be characterized by various methods such as contact angle and ink repellency. The static contact angle with water of the cured low refractive index layer is typically at least 80°. More preferably, the contact angle is at least 90° and most preferably at least 100°. Alternatively, or in addition thereto, the advancing contact angle with hexadecane is at least 50° and more preferably at least 60°. Low surface energy is amenable to anti-soiling and stain repellent properties as well as rendering the exposed surface easy to clean.

The low refractive index polymerizable composition typically also comprises at least one (e.g. non-fluorinated) crosslinker having at least three free-radically polymerizable groups, as previously described. The low refractive index comprises at least 5 wt-%, or 10 wt-%, or 15 wt-% and generally no greater than about 40 wt-% solids of crosslinker.

The low refractive index layer preferably comprises one or more free-radically polymerizable materials having a fluorine content of at least 25 wt-%. Highly fluorinated monomer, oligomers, and polymers are characterized by having a low refractive index. Various fluorinated multi- and mono- (meth) acrylate materials having a fluorine content of at least about 25 wt-% are known. In some embodiments, the low refractive index polymerizable composition has a fluorine content of at least 30 wt-%, at least 35 wt-%, at least 40 wt-%, at least 45 wt-%, or at least 50 wt-%. Typically, a major portion of the high fluorinated material is a multifunctional free-radically polymerizable material. However, such materials can be used in combination with fluorinated mono- functional materials.

Various fluorinated mono- and multi-(meth)acrylate compounds may be employed in the preparation of the polymerizable low refractive index coating composition. Such materials generally comprise free-radically polymerizable moieties in combination with (per)fluoropolyether moieties, (per)fluoroalkyl moieties, and (per)fluoroalkylene moieties. Within each of these classes are species having a high fluorine content, (e.g. of at least 25 wt-%). Other species within each class, having fluorine content less than 25 wt-%, can be employed as auxiliary components.

In some embodiments, such auxiliary fluorinated (meth) acrylate monomers can aid in compatibilizing the low refractive index or other fluorinated materials present in the reaction mixture. For example, perfluoropolyether urethane compounds have been found to be particularly useful for compatibilizing high fluorine containing materials such as described in Published U.S. Patent Application Nos. 2006/0216524; 2006/0216500; and 2007/0286992. Such perfluoropolyether urethane compounds generally include at least one polymerizable (e.g. terminal) (meth)acrylate moiety and at least one (optionally repeating) unit including a (per)fluoropolyether group bonded by means of a linking group having a valency of at least two to a urethane or urea linkage. The urethane and urea linkage is typically —NHC(0)X— wherein X is O, S or NR; and R is H or an alkyl group having 1 to 4 carbon. The perfluoropolyether moiety is preferably a HFPO—moiety, wherein HFPO is $F(CF(CF_3)CF_2O)aCF(CF_3)$—and "a" averages 2 to 15. In some embodiment "a" averages about 4 or 6. One exemplary high fluorine perfluropolyether urethane (meth)acrylate is $HFPO—C(O)NHC_2H_4OC(O)NHC_2H_4OC(O)C(CH_3)=CH_2$.

In preferred embodiments, the low refractive index polymerizable composition comprises at least one free-radically polymerizable fluoropolymer.

In some embodiments, the fluoropolymers are formed from the constituent monomers known as tetrafluoroethylene ("TFE"), hexafluoropropylene ("HFP"), and vinylidene fluoride ("VDF," "VF2,"). The monomer structures for these constituents are shown below:

TFE: $CF_2=CF_2$ (1)

VDF: $CH_2=CF_2$ (2)

HFP: $CF_2=CF—CF_3$ (3)

The fluoropolymers preferably comprise at least two of the constituent monomers (HFP and VDF), and more preferably all three of the constituents monomers in varying molar amounts.

The fluoropolymer comprises free-radically polymerizable groups. This can be accomplished by the inclusion of halogen-containing cure site monomers ("CSM") and/or halogenated endgroups, which are interpolymerized into the polymer as described for example in U.S. Pat. No. 7,323,514; incorporated herein by reference. These halogen groups provide reactivity towards the other components of coating mixture and facilitate the formation of the polymer network.

Optionally halogen cure sites can be introduced into the polymer structure via the use of halogenated chain transfer agents which produce fluoropolymer chain ends that contain reactive halogen endgroups. Such chain transfer agents ("CTA") are well known in the literature and typical examples are: $Br—CF_2CF_2—Br$, $CF_2Br_2$, $CF_2T_2$, $CH_2I_2$. Other typical examples are found in U.S. Pat. No. 4,000,356 to Weisgerber.

Alternatively or in addition thereto, the fluoropolymer can be rendered reactive by dehydrofluorination, such as described in US2006/0148996, to provide sufficient carbon-carbon unsaturation of the fluoropolymer to create increased bonding between the fluoropolymer and a hydrocarbon substrate or layer.

In some embodiments, the fluoropolymer-containing low refractive index composition described herein preferably comprise at least one amino organosilane ester coupling agent or a condensation product thereof as described in U.S. Publication No. 2006/0147723. Preferred amino organosilane ester coupling agent include 3-aminopropyltrimethoxysilane, 3-aminopropyltriethoxysilane, (aminoethylaminomethyl) phenethyltrimethoxysilane, (aminoethylaminomethyl)phenethyltriethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 4-aminobutyltrimethoxysilane, 4-aminobutyltriethoxysilane, 3-aminopropylmethyldiethoxysilane, 3-aminopropylmethyldimethoxysilane, 3-aminopropyldimethylmethoxysilane, 3-aminopropyldimethylethoxysilane, 2,2-dimethoxy-1-aza-2-silacyclopentane-1-ethanamine, 2,2-diethoxy-1-aza-2-silacyclopentane-1-ethanamine, 2,2-diethoxy-1-aza-2-silacyclopentane, 2,2-dimethoxy-1-aza-2-silacyclopentane, 4-aminophenyltrimethoxy silane, and 3-phenylaminopropyltrimethoxy silane.

In another embodiment, the low refractive index layer comprises the reaction product of a A) fluoro(meth)acrylate polymeric intermediate and B) at least one fluorinated (meth) acrylate monomer as described in U.S. Publication No. 2007/0286993; incorporated herein by reference. The mixture of A) and B) is preferably cured by exposure to (e.g. ultraviolet light) radiation. The cured low refractive index polymeric composition may comprise copolymerization reaction products of A) and B). The cured low refractive index polymeric composition is surmised to also comprise polymerization products of B). The fluoro(meth)acrylate polymer intermediate may covalently bond to other components within the low refractive index coating composition. Further, other optional components of the low refractive index coating, e.g. such as non-fluorinated crosslinker, may polymerize physically entangling the fluoro(meth)acrylate polymer intermediate thereby forming an interpenetrating network.

The A) fluoro(meth)acrylate polymeric intermediate comprises the reaction product of i) at least one fluorinated multi-(meth)acrylate monomer or oligomer having a fluorine content of at least about 25 wt-%; and ii) optionally one or more fluorinated or non-fluorinated multi-(meth)acrylate materials. The optional multi-(meth)acrylate material may include a monomer, oligomer, polymer, surface modified inorganic nanoparticles having multi-(meth)acrylate moieties, as well as the various combinations of such materials. The total amount of multi-(meth)acrylate materials is generally at least 25 wt-% based on wt-% solids of the polymerizable organic composition. The total amount of multi-(meth)acrylate materials may range from about 30 wt-% to 70 wt-% of the nanoparticle containing composition.

The low refractive index composition may comprise various monofunctional and/or multi-functional HFPO-perfluoropolyether compounds. The inclusion of at least about 5 wt-% to about 10 wt-% of these materials in the low refractive index layer can provide low energy surfaces having an initial static contact angle with water of at least 110°.

One preferred high fluorine containing multi-functional perfluoropolyether compound is an acrylate oligomer reported by the supplier to have a refractive index of 1.341 commercially available from Sartomer under the trade designation "CN4000". In view of the low refractive index, this material is believed to have a fluorine content of at least about 50 wt-%. Based on NMR analysis, CN4000 has a molecular weight (Mn) of about 1300 g/mole.

Another preferred high fluorine containing multi-functional free-radically polymerizable material is a (per)fluoropolyether multi-(meth)acryl compound prepared by a Michael-type addition of a reactive (per)fluoropolyether multi-(meth)acrylate with an amine compound having 2 to 4 Michael-type addition hydrogens. One exemplary adduct is prepared by the reaction of $CH_2=CHC(O)-OCH_2(CF_2)_4 CH_2O-C(O)CH=CH_2$ with 4-(aminomethyl)piperidine.

Preferred high fluorine perfluoroalkyl multi-(meth)acrylate include those describe in Table 1 as follows:

TABLE 1

| Chemical Description | Supplier (Location) | Wt-% Fluorine |
|---|---|---|
| 2,2,3,3,4,4,5,5-octafluorohexane-1,6-diacrylate | Exfluor Research Corp., Round Rock, TX | 41.06 |
| 2,2,3,3,4,4,5,5-octafluoro hexane-1,6-dimethacrylate | Exfluor Research Corp. | 38.16 |
| 2,2,3,3-tetrafluorobutane-1,4-diacrylate | Oakwood Products Inc., West Columbia, SC | 28.13 |
| 2,2,3,3-tetrafluorobutane-1,4-dimethacrylate | Oakwood Products Inc. | 25.49 |
| fluorinated tetraethylene glycol diacrylate | Oakwood Products Inc. | |
| 2,2,3,3,4,4-hexafluoropentane-1,5-diacrylate | SynQuest Laboratories, Inc. Alachua, FL | 35.6 |

The low and high refractive index polymerizable coating compositions may further comprise at least one difunctional (meth)acrylate monomer. Various difunctional (meth)acrylate monomers are known in the art, including for examplel, 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, cyclohexanedimethanol diacrylate, diethylene glycol diacrylate, dipropylene glycol diacrylate, neopentyl glycol diacrylate, polyethylene glycol diacrylate, (Mn =200 g/mole, 400 g/mole, 600 g/mole), propoxylated neopentyl glycol diacrylate, tetraethylene glycol diacrylate, tricyclodecanedimethanol diacrylate, triethylene glycol diacrylate, and tripropylene glycol diacrylate.

At least one free-radical initiator is typically utilized for the preparation of the polymerizable low and high refractive index coating compositions. Useful free-radical thermal initiators include, for example, azo, peroxide, persulfate, and redox initiators, and combinations thereof. Useful free-radical photoinitiators include, for example, those known as useful in the UV cure of acrylate polymers. In addition, other additives may be added to the final composition. These include but are not limited to resinous flow aids, photostabilizers, high boiling point solvents, and other compatibilizers well known to those of skill in the art.

The polymerizable compositions can be formed by dissolving the free-radically polymerizable material(s) in a compatible organic solvent at a concentration of about 1 to 10 percent solids. A single organic solvent or a blend of solvents can be employed. Depending on the free-radically polymerizable materials employed, suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

Although various fluorinated solvents could be employed, in one aspect compatible low refractive index coating compositions are prepared that are free of fluorinated solvents. Compatible coating compositions are clear, rather than hazy. Compatible coatings are substantially free of visual defects. Visual defects that may be observed when incompatible coating are employed include but are not limited to haze, pock marks, fisheyes, mottle, lumps or substantial waviness, or other visual indicators known to one of ordinary skill in the art in the optics and coating fields.

The method of forming an antireflective coating on an optical display or an antireflective film for use of an optical display may include providing a light transmissible substrate layer; providing the high refractive index hardcoat material, as described herein, on the substrate layer; and providing the low index layer described herein coupled to the high refractive index layer. The low index layer may be provided by applying a layer of said low refractive index material onto said (e.g. cured) layer of said high refractive index material and irradiating with a sufficient ultraviolet radiation to crosslink. Alternatively, the low refractive index coating may be applied to a release liner, at least partially cured, and transfer coated onto the high index layer. Further, the antireflection material may be applied directly to a substrate or alternatively applied to a release layer of a transferable antireflection film and subsequently transferred from the release layer to the substrate using a thermal or radiation-induced transfer. Suitable transfer methods are described in Published U.S. Application No. 2006/0147614.

The low refractive index composition and high refractive index composition can be applied as a single or multiple layers to a high refractive index layer or directly to a (e.g. display surface or film) substrate using conventional film application techniques. Advantageously, a combination of low reflectance and good durability can be obtained with a single low refractive index layer provided on a single high refractive index layer.

Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, *Modern Coating and Drying Technology*, VCH Publishers, NY 1992, ISBN 3-527-28246-7 and Gutoff and Cohen, *Coating and Drying Defects: Troubleshooting Operating Problems*, Wiley Interscience, NY ISBN 0-471-59810-0.

Although it is usually convenient for the substrate to be in the form of a roll of continuous web, the coatings may be applied to individual sheets.

The low refractive index as well as high refractive index coating composition are dried in an oven to remove the solvent and then cured for example by exposure to ultraviolet radiation using an H-bulb or other lamp at a desired wavelength, preferably in an inert atmosphere (less than 50 parts per million oxygen). The reaction mechanism causes the free-radically polymerizable materials to crosslink.

The light transmissive substrate may comprise or consist of any of a wide variety of non-polymeric materials, such as glass, or various thermoplastic and crosslinked polymeric materials, such as polyethylene terephthalate (PET), (e.g. bisphenol A) polycarbonate, cellulose acetate, poly(methyl methacrylate), and polyolefins such as biaxially oriented polypropylene which are commonly used in various optical devices. Further, the substrate may comprise a hybrid material, having both organic and inorganic components. The substrate, the high refractive index hardcoat, as well as the antireflective film typically have a transmission of at least 80%, at least 85%, and preferably at least 90%.

For most applications, the substrate thicknesses is preferably less than about 0.5 mm, and more preferably about 20 microns to about 200 microns. Self-supporting polymeric films are preferred. The polymeric material can be formed into a film using conventional filmmaking techniques such as by extrusion and optional uniaxial or biaxial orientation of the extruded film. The substrate can be treated to improve adhesion between the substrate and the adjacent layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

The antireflective film may comprise other layers. Various permanent and removable grade adhesive compositions may be provided on the opposite side of the film substrate. For embodiments that employ pressure sensitive adhesive, the antireflective film article typically include a removable release liner. During application to a display surface, the release liner is removed so the antireflective film article can be adhered to the display surface.

Suitable adhesive compositions include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

Various light transmissive optical films suitable for use as the film substrate are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150, Jan. 29, 2004.

As described in U.S. Patent Application 2003/0217806 multilayer optical films provide desirable transmission and/or reflection properties at least partially by an arrangement of microlayers of differing refractive index. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

Further details of suitable multilayer optical films and related constructions can be found in U.S. Pat. No. 5,882,774 (Jonza et al.), and PCT Publications WO 95/17303 (Ouderkirk et al.) and WO 99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

The antireflective film may have a gloss or matte surface. Matte antireflective films typically have lower transmission and higher haze values than typical gloss films. For examples the haze is generally at least 5%, 6%, 7%, 8%, 9%, or 10% as measured according to ASTM D1003. Whereas gloss surfaces typically have a gloss of at least 130 as measured according to ASTM D 2457-03 at 60°; matte surfaces have a gloss of less than 120.

The surface can be roughened or textured to provide a matte surface. This can be accomplished in a variety of ways as known in the art including embossing the low refractive index surface together with the underlying layer(s) with a suitable tool that has been bead-blasted or otherwise roughened, as well as by curing the composition against a suitable roughened master as described in U.S. Pat. Nos. 5,175,030 (Lu et al.) and 5,183,597 (Lu).

In yet another aspect, matte antireflective films can be prepared by providing the high refractive index layer and low refractive index (e.g. surface) layer on a matte film substrate. Exemplary matte films are commercially available from U.S.A. Kimoto Tech, Cedartown, Ga. under the trade designation "N4D2A."

Matte low and high refractive index coatings can also be prepared by adding a suitably sized particle filler such as silica sand or glass beads to the composition. Such matte particles are typically substantially larger than the surface modified low refractive index particles. For example the average particle size typically ranges from about 1 to 10 microns. The concentration of such matte particles may range from at least 2 wt-% to about 10 wt-% or greater. At concentrations of less than 2 wt-% (e.g. 1.8 wt-%, 1.6 wt-%, 1.4 wt-%, 1.2 wt-%, 1.0 wt-%, 0.8 wt-%, 0.6 wt-%, the concentration is typically insufficient to produce the desired reduction in gloss (which also contributes to an increase in haze). However, durable antireflective films can be provided in the absence of such matte particles.

In order to reduce or eliminate optical fringing within the high refractive index layer it is preferred that the antireflective film substrate has a refractive index close to that of the high refractive index layer, i.e. differs from the high refractive index layer by less than 0.05, and more preferably less than 0.02. Alternatively, optical fringing can be eliminated or reduced by providing a high index primer on the film substrate, the primer being chosen to closely match the refractive index of the high refractive index layer and substrate. However, when the substrate has a low refractive index, the difference in refractive index between the high refractive index layer and the substrate can range from about 0.05 to 0.10 and greater. For this embodiment, it is not possible to concurrently match the refractive index of the primer to both the high refractive index layer and the (i.e. low refractive index) substrate. In this embodiment, optical fringing is reduced or eliminated by formulating the primer to have a refractive index intermediate (i.e. median +/−0.02) between the low refractive index substrate and the high refractive index layer.

An antistatic coating can be applied to the (e.g. optionally primed) substrate prior to coating the hardcoat.
The thickness of the antistatic layer is typically at least 20 nm and generally no greater than 400 nm, 300 nm, or to 200 nm.

The antistatic coating may comprise at least one conductive polymer as an antistatic agent. Various conductive polymers are known. Examples of useful conductive polymers include polyaniline and derivatives thereof, polypyrrole, and polythiophene and its derivatives. One particularly suitable polymer is poly(ethylenedioxythiophene) (PEDOT) such as poly(ethylenedioxythiophene) doped with poly(styrenesulfonic acid) (PEDOT:PSS) commercially available from H.C. Starck, Newton, Mass. under the trade designation "BAYTRON P".

In other embodiments, the antistatic coating or hardcoat composition may comprise conductive metal-containing particles, such as metals or semiconductive metal oxides. Such particles may also be described as nanoparticles having a particle size or associated particle size of greater than 1 nm and less than 200 nm. Various granular, nominally spherical, fine particles of crystalline semiconductive metal oxides are known. Such conductive particles are generally binary metal oxides doped with appropriate donor heteroatoms or containing oxygen deficiencies. Suitable conductive binary metal oxides may comprise tin oxide, indium oxide, and vanadium pentoxide. Various antistatic particles are commercially available as water-based and solvent-based dispersions. Antimony tin oxide (ATO) nanoparticle dispersions that can be used include a dispersion available from Air Products under the trade designation "Nano ATO S44A" (25 wt-% solids, water), 30 nm and 100 nm (20 wt-% solids, water) dispersions available from Advanced Nano Products Co. Ltd. (ANP), 30 nm and 100 nm ATO IPA sols (30 wt-%) also available from ANP, a dispersion available from Keeling & Walker Ltd under the trade designation "CPM10C" (19.1 wt-% solids), and a dispersion commercially available from Ishihara Sangyo Kaisha, Ltd under the trade designation "SN-100 D" (20 wt-% solids). Further, an antimony zinc oxide (AZO) IPA sol (20 nm, 20.8 wt-% solids) is available from Nissan Chemical America, Houston Tex. under the trade designations "CELNAX CX-Z210IP", "CELNAX CX-Z300H" (in water), "CELNAX CX-Z401M" (in methanol), and "CELNAX CX-Z653M-F" (in methanol).

For nanoparticle antistats, the antistatic agent is present in an amount of at least 20 wt-%. For conducting inorganic oxide nanoparticles, levels can be up to 80 wt % solids for refractive index modification. When a conductive polymer antistat is employed, it is generally preferred to employ as little as possible due to the strong absorption of the conductive polymer in the visible region. Accordingly, the concentration is generally no greater than 20 wt-% solid, and preferably less than 15 wt-%. In some embodiments the amount of conductive polymer ranges from 2 wt-% to 5 wt-% solids of the dried antistatic layer.

The antireflective films described herein are suitable for application to optical displays ("displays"). The displays include various illuminated and non-illuminated display panels. Such displays include multi-character and especially multi-line multi-character displays such as liquid crystal displays ("LCDs"), plasma displays, front and rear projection displays, cathode ray tubes ("CRTs"), signage, as well as single-character or binary displays such as light emitting tubes ("LEDs"), signal lamps and switches.

The antireflective film can be employed with a variety of portable and non-portable information display articles. These articles include, but are not limited to, PDAs, LCD-TV's (both edge-lit and direct-lit), cell phones (including combination PDA/cell phones), touch sensitive screens, wrist watches, car navigation systems, global positioning systems, depth finders, calculators, electronic books, CD and DVD players, projection televisions screens, computer monitors, notebook computer displays, instrument gauges, and instrument panel covers. These devices can have planar or curved viewing faces.

The antireflective material can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, eyeglasses, overhead projectors, stereo cabinet doors, stereo covers, watch covers, as well as optical and magneto-optical recording disks, and the like.

The antireflective film may also be applied to a variety of other articles including (e.g. retroreflective) signage and commercial graphic display films employed for various advertising, promotional, and corporate identity uses.

While the invention has been described in terms of preferred embodiments, it will be understood, of course, that the invention is not limited thereto since modifications may be made by those skilled in the art, particularly in light of the foregoing teachings.

Test Methods

Bend Test (cylindrical mandrel) as described in ISO 1519 was used to measure the crack resistance of the films, reporting the mandrel (i.e. diameter) size at failure. The bend testing was conducted with the light transmissive film contacting the mandrel. After bending the sample were visually inspected and rated according to the following criteria:
NC—no cracking
LC—light cracking
C—cracking
HC—heavy cracking Fold Test—In a similar manner to the Bend Test, the flexibility was also measured by bending the film about a 1 cm metal cylinder and then advancing and retracting the film five times about the diameter of the cylinder. After bending the sample were visually inspected and rated according to the following criteria:
NC—no cracking
LC—light cracking C—cracking
HC—heavy cracking The fold test is believed to be at least as severe as the Bend Test. Hence, samples that do not crack when tested according to the Bend Test also will not crack when tested according to the Fold Test.

Steel Wool Durability Test

The abrasion resistance of the cured high index hardcoat films was tested cross-web to the coating direction by use of a mechanical device capable of oscillating a steel wool sheet adhered to stylus across the film's surface. The stylus oscillated over a 60 mm wide sweep width at a rate of 210 mm/sec (3.5 wipes/sec) wherein a "wipe" is defined as a single travel of 60 mm. The stylus had a flat, cylindrical base geometry with a diameter of 3.2 cm. The stylus was designed for attachment of weights to increase the force exerted by the steel wool normal to the film's surface. The #0000 steel wool sheets were "Magic Sand-Sanding Sheets" available from Hut Products Fulton, Mo. The #0000 has a specified grit equivalency of 600-1200 grit sandpaper. The 3.2 cm steel wool discs were die cut from the sanding sheets and adhered to the 3.2 cm stylus base with 3M Brand Scotch Permanent Adhesive Transfer tape. A single sample was tested for each example, with the weight and the number of wipes employed during testing as reported. The sample was then visually inspected for scratches and rated according to the following criteria.

NS—no scratches
SS— slight scratches
S— scratches
HS— heavy scratches

| Trade Designation/ Abbreviation | Chemical Description | Supplier |
|---|---|---|
| SR295 | pentaerythritol tetraacrylate | Sartomer |
| CN120 | epoxy acrylate | Sartomer |
| SR339 | phenoxyethyl acrylate | Sartomer |
| SR399 | dipentaerythritol pentaacrylate | |
| SR601 | bisphenol-A ethoxylated diacrylate monomer | Sartomer |
| SR602 | bisphenol-A ethoxylated diacrylate monomer | Sartomer |
| SR499 | ethoxylated trimethylpropane triacrylate | |
| Silquest A-1230 | polyalkyleneoxidesilane ester | GE Silicones, Friendly, WV |
| Silquest A-174 or A17714 | gamma-methacryloxypropyltrimethoxysilane (97 wt-% solids solution) "MPTMS" | GE Silicones Alpha Aesar, Ward Hill, MA |
| SIA0200.0 | 3-(acryloxypropyl)trimethoxysilane (inhibited with MEHQ, "APTMS" | Gelest |
| HX-305M5 | tin oxide and zirconia covered by antimony oxide nanoparticle dispersion (10-20 nm, 30 wt-% solids in methanol) | Nissan Chemical America, Houston, TX |
| CX-S401M | tin oxide nanoparticles doped with 0.01% $P_2O_5$ dispersion (about 10 nm, 40 wt-% solids in methanol) | Nissan Chemical America, Houston, TX |
| MEEAA | methoxyethoxyethoxyacetic acid | Sigma-Aldrich |
| SAC | mono-2-(acryloyloxy)ethyl succinate | Sigma-Aldrich |
| Dowanol PM | 1-methoxy-2-propanol | Sigma-Aldrich |
| Irgacure 184 | 1-hydroxy-cyclohexylphenyl ketone | CIBA, Tarrytown, New York |
| Prostab 5198 | 4-hydroxy-2,2,6,6-tetramethyl-1-piperidinyloxy (commonly referred to as 4-hydroxy-TEMPO) | CIBA |

$ZrO_2$ Sols

The $ZrO_2$ sols used in the examples had the following properties (as measured according to the Photo Correlation Spectroscopy (PCS), X-Ray Diffraction and Thermal Gravimetric Analysis methods described in U.S. patent application Ser. Nos. 11/079,832 and 11/078468):

| | PCS Data | | | |
|---|---|---|---|---|
| Dispersion Index | Intensity avg size (nm) | Volume- avg size (nm) | (Intensity-avg)/(Volume-avg) | |
| 1.0-2.4 | 23.0-37.0 | 8.0-18.8 | 1.84-2.97 | |

| Relative Intensities | | Apparent Crystallite Size (nm) | | | | % C/T - primary | Weighted |
|---|---|---|---|---|---|---|---|
| Cubic/ Tetragonal | Monoclinic | (C, T) (1 1 1) | M (−1 1 1) | M (1 1 1) | Avg M Size | particle size | Avg XRD Size |
| 100 | 6-12 | 7.0-8.5 | 3.0-6.0 | 4.0-11.0 | 4.5-8.3 | 89%-94% | 7.0-8.4 |

The preparation of $ZrO_2$ sols is described in U.S. Patent Publication No. 2006/0204745 and application Ser. No. 11/078,468 filed Mar. 11, 2005.

Preparation of Surface Modified High Index Nanoparticles

1. $ZrO_2$— MPTMS

A 2000 ml 3-neck flask equipped with an addition funnel, temperature controller, paddle stirrer, oil bath and distilling head was charged with 500 g of a 47.7 wt-% solids $ZrO_2$ dispersion. To this dispersion, a premix of 358.6 g deionized water and 0.54 g 5 wt-% Prostab 5198 (aqueous solution) was added with stirring. Next 758.6 g 1-methoxy-2-propanol was added to the batch, followed by 63.9 g 3-(methacryloyloxy)propyltrimethoxysilane (MPTMS) and 100 g 1-methoxy-2-propanol. The batch was heated to 80 deg C. and held for approximately 16 hours. The resulting mixture was a viscous, opaque white slurry. The batch was cooled to room temperature. The water was removed from the batch by alternate vacuum distillation and addition of 1782 g 1-methoxy-2-propanol. The batch was further concentrated by vacuum distillation to result in a low viscosity, translucent dispersion with 59.1 wt-% solids.

2. $ZrO_2$—3:1 MPTMS/A1230

A dispersion was formed in the same manner as Preparation 5 (described below) except that the concentrations of MPTMS and Silquest A-1230 were modified to a molar ratio of 3:1.

3. $ZrO_2$—5:1 MPTMS/A1230

A dispersion was formed in the same manner as Preparation 5 except that the concentrations of MPTMS and Silquest A-1230 were modified to a molar ratio of 5:1.

4. $ZrO_2$—7:1 MPTMS/A1230

A dispersion was formed in the same manner as Preparation 5 described below except that the concentrations of MPTMS and Silquest A-1230 were modified to a molar ratio of 7:1.

5. $ZrO_2$—9:1 MPTMS/A1230 A 2000 ml 3-neck flask equipped with an addition funnel, temperature controller, paddle stirrer, oil bath and distilling head was charged with 500 g of a 47.7 wt-% solids $ZrO_2$ dispersion. To this dispersion, a premix of 358.6 g deionized water and 0.54 g 5 wt % Prostab 5198 (aqueous solution) was added with stirring. Next 758.6 g 1-methoxy-2-propanol was added to the batch, followed by 12.9 g Silquest A-1230, 57.5 g MPTMS and 100 g 1-methoxy-2-propanol. The batch was heated to 80 deg C. and held for approximately 16 hours. The resulting mixture was an opaque white slurry. The batch was cooled to room temperature. The water was removed from the batch by alternate vacuum distillation and addition of 1500 g 1-methoxy-2-propanol. After removal of the water, the batch was a 16.5 wt-% solids, translucent, low viscosity dispersion. The batch was further concentrated to ~22% solids by vacuum distillation. At this point, 10 g of 29% ammonium hydroxide solution was added to the batch. There was no noticeable appearance change of the batch with addition of the ammonium hydroxide solution. Finally, the batch was concentrated further by vacuum distillation. The resulting dispersion was a low viscosity, translucent dispersion with 58.1 wt % solids.

6. $ZrO_2$—9:1 APTMS/A1230

A 2000 ml 3-neck flask equipped with an addition funnel, temperature controller, paddle stirrer, oil bath and distilling head was charged with 500 g of a 47.7 wt % solids $ZrO_2$ dispersion. To this dispersion, 558.6 g 1-methoxy-2-propanol was added with mixing. Next a premix of 0.54 g 5 wt-% Prostab 5198 (aqueous solution), 54.25 g 3-(acryloxypropyl)trimethoxysilane (APTMS) and 19.3 g Silquest A-1230 was added with stirring. A coarse, off-white slurry formed. The premix beaker was rinsed with two aliquots of 150 g each 1-methoxy-2-propanol. The rinses were added to the batch. The batch was heated to 80 deg C. and held for approximately 16 hours. The resulting mixture was a homogeneous, opaque dispersion with a bluish cast. The batch was cooled to room temperature. The water was removed from the batch by alternate vacuum distillation and addition of 400 g 1-methoxy-2-propanol. The batch was concentrated further by vacuum distillation. The final dispersion was a low viscosity, translucent dispersion with 59.1 wt % solids.

7. $ZrO_2$—9:1 SAC/MEEAA A 500 ml flask equipped with a dropping funnel, temperature controller, paddle stirrer, and distilling head was charged with 148.68 g of 25 wt-% solids $ZrO_2$ dispersion and 124 g of 1-methoxy-2-propanol. Then 0.8 g of MEEAA and 8.6 g of SAC were added under rapid stirring, which resulting a cloudy mixture. After 2 hour mixing, most of solvent was removed using rotary-evaporator. The resulting white paste/gel like material was re-dispersed in 200 g of 1-methoxy-2-propanol/MEK (1:1) mixture to form a transparent sol. After 1 hour, the solvent including MEK and some amount of 1-methoxy-2-propanol was removed to yield a translucent dispersion with 60 wt-% solid.

8. $ZrO_2$—9.5:0.5 SAC/5% MEEAA $ZrO_2$ sol (10 g at 40.87 wt-% solids), MEEAA (0.87 g), 1-methoxy-2-propanol (172 g) and SAC (18.8 g of 50% solids in 1-methoxy-2-propanol) were charged to a 3 neck 1 L RB flask. Water and alcohol were removed via vacuum distillation such that the resultant dispersion was approximately 73.4% solids in 1-methoxy-2-propanol. 2-butanone (18.5 g) was charged to the flask such that the final composition of the dispersion was approximately 58 wt-% solids in a 1/1 mix of 1-methoxy-2-propanol/2-butanone.

9. $SnO_2/ZrO_2/SbO_2$—9.47:0.53 MPTMS/A1230

A 250 ml flask equipped with a dropping funnel, temperature controller, paddle stirrer, and distilling head was charged with 100 g of HX-305M5 and 5 g of 0.01 N HCl. After 5 min, 7.2 g of MPTMS and 0.8 g of Silquest A-1230 were pre-mixed and added drop-by-drop under rapidly stirring. The resulting mixture was then heated to reflux for 12 hours. After cooling down to room temperature, 50 g of 1-methoxy-2-propanol was then added under constant stirring. The solution was transferred to a round flask, then the solvent, including methanol, water, and some amount of 1-methoxy-2-propanol was removed using rotary-evaporator, resulting a viscous liquid methoxypropanol sol with 67.5 wt-% solids.

10. $SnO_2$ –9.5:0.5 MPTMS/A1230 A 250 ml flask equipped with a dropping funnel, temperature controller, paddle stirrer, and distilling head was charged with 40 g of CX-S401M, 30 g of methoxypropanol, and 0.2 g of water under stirring. After 5 min, 3.8 g of MPTMS and 0.4 g of Silquest A-1230 was pre-mixed and added drop-by-drop under rapidly stirring. The resulting mixture was then heated to reflux for 12 hours. After cooling down to room temperature, 25 g of methoxypropanol was then added under constant stirring. The solution was transferred to a round flask, then the solvent, including methanol, water, and some amount of methoxypropanol was removed using rotary-evaporator, resulting a viscous liquid methoxypropanol sol with 59.6 wt-% solids.

11. $ZrO_2$—3:1 APTMS/A1230

A dispersion was formed in the same manner as Preparation 6 except that the concentrations of APTMS and Silquest A-1230 were modified to a molar ratio of 3:1.

The following table sets forth the relationship between the wt-% $ZrO_2$ and wt-% surface modified $ZrO_2$.

wt % ZrO2 in Hardcoat for Various MPTMS/A1230 Ratios
and Nominal Surface Modifed ZrO2 Loadings

|  |  | MPTMS/A1230 | | | |
|---|---|---|---|---|---|
| % SM ZrO2 in Hardcoat | 100% MPTMS | 9/1 | 7/1 | 5/1 | 3/1 |
| 100 | 79.6 | 77.7 | 77.2 | 76.5 | 75.0 |
| 90 | 71.6 | 69.9 | 69.5 | 68.9 | 67.5 |
| 85 | 67.7 | 66.0 | 65.6 | 65.0 | 63.8 |
| 80 | 63.7 | 62.2 | 61.8 | 61.2 | 60.0 |
| 70 | 55.7 | 54.4 | 54.0 | 53.6 | 52.5 |

Coating and Curing the High Refractive Index Layer

Each of the high refractive index coating formulations were diluted to 45 wt-% solids with a 1:1 blend of 1-methoxy-2-propanol and MEK. The diluted coatings were then coated onto the unprimed surface of a 5 mil PET film (obtained from Dupont under the trade designantion "Melinex 618") using wire-wound Mayer coating rods (#7 rod for 3 micron coating, #10 rod for 4.5 micron coating, and #14 for 7 micron coating). Each coating was then dried in an oven for 2 minutes at 100° C. The dried coatings were then photocured under nitrogen at 100% H bulb with a Light Hammer 6 UV source (Fusion UV Systems, Inc., Gaithersburg, Md.) 1 pass at 30 fpm and a second pass at 10 fpm.

Preparation of High Refractive Index Coatings Examples 1-4

85 wt-% of the $ZrO_2$ nanoparticles surface modified with MPTMS (according to Preparation 1) were combined with 13 wt-% of the polymerizable resin indicated in the following table and 2 wt-% Irgacure 184 photoinitiator. The compositions were coated and cured as previously described. The test results are set forth as follows:

|  | Polymerizable Resin | Fold Test | RI | 1 kg/ 25 rubs | 1 kg/ 50 rubs | 1 kg/ 100 rubs |
|---|---|---|---|---|---|---|
| Example 1 | SR399/SR499 | C | 1.677 | HS | HS | HHS |
| Example 2 | CN120 | C | 1.692 | HS | HHS | HHS |
| Example 3 | SR601 | NC | 1.687 | SS | S | HS |
| Example 4 | SR602 | NC | 1.683 | S | HS | HHS |

The results show that when the high refractive index nanoparticles are surface modified with solely MPTMS, the composition comprising SR602 or SR602 exhibited improved flexibility relative to CN120 and a 1:1 blend of SR399 and SR499.

Preparation of Comparative High Refractive Index Coatings and Examples 5 - 7

The Comparative Composition contained $ZrO_2$ surface modified with MPTMS and Silquest A1230 at a molar ratio of 3:1. The surface modified $ZrO_2$ were combined with 48% SR295, 35% CN120, 17% SR339, and 1 wt-% Irgacure 184 as described in Example 15 of U.S. Pat. No. 7,264,872 (Walker et al.).

$ZrO_2$ was surface modified with MPTMS and Silquest A1230 according to Preparations 2-5 and combined with SR601 and 1 wt-% Irgacure 184 such that the composition contained 70 wt-% $ZrO_2$ (i.e. the same concentration as the Comparative).

The compositions were coated and cured as previously described. The test results are as follows:

Bend Test (Cylindrical Mandrel)

| HIHC Cured Thickness | Comparative 3:1 | Example 5 5:1 | Example 6 7:1 | Example 7 9:1 |
|---|---|---|---|---|
| 2 microns | NC | NC | NC | Not tested |
| 3 microns | LC | NC | NC | Not tested |
| 4.5 microns | C | C | LC | NC |
| 7 microns | HC | HC | C | Not tested |

The results show that the Comparative exhibited cracking at thicknesses of 3 microns, 4.5 microns and 7 microns; whereas the compositions of Examples 5-7 exhibited better flexibility, i.e. no cracking at higher thicknesses.

Durability Testing at Cured Thickness of 4.5 Microns

|  | Fold Test | Refractive Index | Steel Wool 200 g/25 rubs | Steel Wool 300 g/25 rubs |
|---|---|---|---|---|
| Comparative 3:1 | C | 1.69 | Scratch | Not tested |
| Example 5 5:1 | C | 1.70 | Scratch | Not tested |
| Example 6 7:1 | LC | 1.69 | No Scratch | Scratch |
| Example 7 9:1 | NC |  | No Scratch | No Scratch |

The results show that the 7:1 ratio was better with than the 5:1 ratio with regard to Steel Wool durability.

Preparation of High Refractive Index Coatings Examples 8-9

85 wt-% of the $ZrO_2$ nanoparticles surface modified according to Preparations 5 and 6 were combined with 13 wt-% of CN120 and 2 wt-% Irgacure 184 photoinitiator. The compositions were coated and cured as previously described. The test results are set forth as follows:

Durability and Flexibility Testing at Cured Thickness of 4 Microns

|  | Polymerizable Resin | Fold Test | RI | 1 kg/ 25 rubs | 1 kg/ 50 rubs | 1 kg/ 100 rubs |
|---|---|---|---|---|---|---|
| Example 8 MPTMS/A1230 9:1 (Prep 5) | CN120 | NC | 1.6936 | HS | HHS | HHS |
| Example 9 APTMS/ A1230 9.5:0.5 (Prep 6) | CN120 | SC | 1.6982 | HS | HHS | HHS |

By comparing Example 8 with Example 2 it is evident that employing a polymerizable surface treatment in combination with a second surface treatment comprising a non-reactive compatibilizing group improves the flexibility of the cured hardcoat independent of the type of polymerizable resin employed. By comparing Example 8 to 9, it is evident that the (meth)acryl functionality of MPTMS provides better flexibility than the acryl functionality of APTMS.

Preparation of High Refractive Index Coatings Examples 10-12

The ZrO$_2$ nanoparticles surface modified according to Preparation 5 were combined with 5 wt-% of the polymerizable resin indicated in the following table and 2 wt-% Irgacure 184 photoinitiator. The compositions were coated and cured as previously described. The test results are set forth as follows:

Durability and Flexibility Testing at Cured Thickness of 4 microns

|  | Polymerizable Resin | Fold Test | RI | 1 kg/ 25 rubs | 1 kg/ 50 rubs | 1 kg/ 100 rubs |
|---|---|---|---|---|---|---|
| Example 10 MPTMS/A1230 9:1 (Prep 5) | CN120 | C | 1.7049 | | | |
| Example 11 MPTMS/A1230 9:1 (Prep 5) | SR601 | NC | 1.6908 | S | HS | HHS |
| Example 12 MPTMS/A1230 9:1 (Prep 5) | SR602 | NC | 1.6875 | HS | HS | HHS |

The results show that at a concentration of 70 wt-% ZrO$_2$ nanoparticles, a flexible hardcoat can be achieved by selection of the SR601 or SR602 in combination with a high molar ratio copolymerizable surface treatment.

Preparation of High Refractive Index Coatings Examples 13-18

85 wt-% of ZrO$_2$ nanoparticles surface modified according to Preparations 7-10 were combined with 13 wt-% or 8 wt-% of the polymerizable resin indicated in the following table and 2 wt-% Irgacure 184 photoinitiator. The compositions were coated and cured as previously described. The test results are set forth as follows:

Durability and Flexibility Testing at Cured Thickness of 4 Microns

| 85 wt-% ZrO$_2$ | Polymerizable Resin | Fold Test | RI | 1 kg 25 rubs | 1 kg 50 rubs | 1 kg 100 rubs |
|---|---|---|---|---|---|---|
| Example 13 SAC/MEEAA 9:1 (Prep 7) | SR399 | SC | 1.6864 | NS | SS | S |
| Example 14 SAC/MEEAA 9:1 (Prep 7) | SR399/ SR499 | NC | 1.6808 | SS | S | HS |
| Example 15 SAC/MEEAA 9.5:0.5 (Prep 8) | SR399 | C | 1.6864 | NS | SS | S |
| Example 16 SAC/MEEAA 9.5:0.5 (Prep 8) | SR399/ SR499 | SC | 1.6851 | NS | S | S |

Durability and Flexibility Testing at Cured Thickness of 4 Microns

|  | Polymerizable Organic Component | Fold Test | RI | 1 kg 25 rubs | 1 kg 100 rubs | 1 kg 300 rubs |
|---|---|---|---|---|---|---|
| Example 17 HX-305M5 MPTMS/A1230 9.47:0.53 (Prep 9) | SR399 | NC | 1.649 | NS | NS | NS |
| Example 18 HX-305M5 MPTMS/A1230 9.47:0.53 (Prep 9) | SR399/SR499 = 1:1 | NC | 1.6478 | NS | NS | NS |
| Example 19 CX-S401M MPTMS/A1230 9.5:0.5 (Prep 10) | SR399 | NC | 1.646 | NS | NS | NS |
| Example 20 CX-S401M MPTMS/A1230 9.5:0.5 (Prep 10) | SR399/SR601 = 1:1 | NC | 1.655 | NS | NS | NS |

Examples 13-16 show that flexible high refractive index hardcoats can also be obtained by employing other types of copolymerizable surface treatments such as SAC in combination with a non-reactive compatibilizing surface treatment such as MEEAA. Examples 17-20 show that flexible high refractive index hardcoats can also be obtained by employing a combination of copolymerizable and non-reactive compatibilizing surface treatments with other types of high refractive index particles such as those comprising tin oxide.

Durability and Flexibility Testing

|  | Polymerizable Resin | Mandrel Test | Thickness | Curing Conditions |
|---|---|---|---|---|
| Example 21 APTMS/A1230 3:1 (Prep 7) | CN120 | NC NC | 3.4 3.4 | 1 pass at 30 fpm 2 passes at 30 fpm |
| Example 22 APTMS/ A1230 3:1 (Prep 7) | CN120 | LC | 4 | 2 passes at 30 fpm |

By comparing Examples 21-22 to Comparative 3:1 it is evident that increasing the concentration of CN120 also improves the flexibility particularly for thicknesses below 4 microns.

What is claimed is:

1. An antireflective film comprising
a light transmissive substrate having a thickness ranging from about 20 to 200 microns
a high refractive index layer having a refractive index of at least about 1.60 and a thickness ranging from about 3 to 5 microns disposed on the substrate, wherein the high refractive index layer comprises at least 60 wt-% of inorganic nanoparticles having a refractive index of at least 1.60 dispersed in a crosslinked organic material wherein the crosslinked organic material is the reaction product of a polymerizable resin composition comprising at least one di(meth)acrylate monomer or oligomer comprising at least two aromatic rings and an alkoxylated(meth)acrylate group bonded to each of the two rings; and
a low refractive index surface layer, having a refractive index of at least 0.10 less than the high refractive index layer, coupled to the high refractive index layer;
wherein the high refractive index layer does not crack when testing according to ISO 1519 using a mandrel size of 6 mm.

2. The antireflective film of claim 1 wherein the crosslinked organic material is the reaction product of a polymerizable resin composition comprising at least one di(meth)acrylate monomer or oligomer comprising at least two aromatic rings and an alkoxylated (meth)acrylate group bonded to each of the two rings.

3. The antireflective film of claim 1 wherein the monomer or oligomer has the structure:

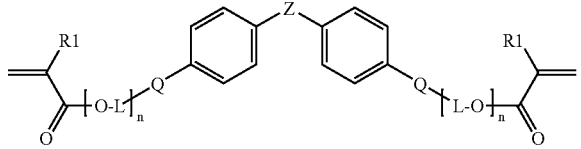

wherein Z is independently —C(CH$_3$)$_2$—, —CH$_2$—, —C(O)—, —S—, —S(O)—, or —S(O)$_2$—;
Q is independently O or S;
L is independently a branched or linear C$_2$-C$_{12}$ alkylene group;
n ranges from 1 to 10; and
R1 is independently H or methyl.

4. The antireflective film of claim 3 wherein n ranges from 1 to 3 and L is a branched or linear C$_2$-C$_6$ alkylene group.

5. The antireflective film of claim 1 wherein the monomer or oligomer has the structure:

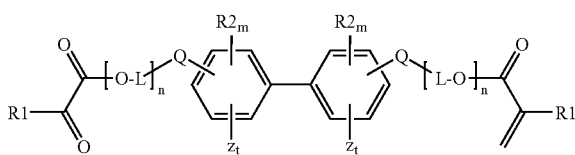

wherein each R1 is independently H or methyl;
each R2 is independently Br;
m ranges from 0 to 4;
each Q is independently O or S;
n ranges from 1 to 10;
L is independently a branched or linear C$_2$-C$_{12}$ alkylene group, z is an aromatic ring; and
t is independently 0 or 1.

6. The antireflective film of claim 5 wherein n ranges from 1 to 3 and L is a branched or linear C$_2$-C$_6$ alkylene group.

7. The antireflective film of claim 1 wherein the inorganic nanoparticles comprise a first surface treatment that copolymerizes with the organic material and a second surface treatment having a non-reactive compatibilizing group.

8. The antireflective film of claim 7 wherein the first surface treatment comprises a (meth)acryl silane.

9. The antireflective film of claim 8 wherein the first surface treatment comprises a (meth)acryloxy alkoxy silane.

10. The antireflective film of claim 9 wherein the first surface treatment is selected from gamma-methacryloxypropyltrimethoxysilane, 3-(acryloxypropyl)trimethoxysilane, and mixtures thereof.

11. The antireflective film of claim 7 wherein the first surface treatment comprises a non-volatile monocarboxylic acid.

12. The antireflective film of claim 7 wherein the non-reactive compatibilizing group comprises a polyether tail.

13. The antireflective film of claim 7 wherein the second surface treatment is a monocarboxylic acid or silane comprising a polyether tail.

14. The antireflective film of claim 7 wherein the first surface treatment and second surface treatment are present at a molar ratio of at least 3:1.

15. The antireflective film of claim 7 wherein the first surface treatment and second surface treatment are present at a molar ratio of at least 5:1.

16. The antireflective film of claim 7 wherein the first surface treatment and second surface treatment are present at a molar ratio of at least 9:1.

17. The antireflective film of claim 1 wherein the crosslinked organic material comprises the reaction product of a polymerizable resin composition and at least one crosslinker having at least three polymerizable (meth)acrylate groups.

18. The antireflective film of claim 1 wherein the light transmissive substrate has a thickness ranging from 4 to 6 mils.

19. The antireflective film of claim 1 wherein the low index layer comprises the reaction product a polymerization resin composition comprising at least one fluorinated free-radically polymerizable fluoropolymer and at least one crosslinker comprising at least three (meth)acrylate groups.

20. An optical device comprising the antireflective film of claim 1.

21. An antireflective film comprising
a high refractive index layer, having a refractive index of at least about 1.60, coupled to a low refractive index surface layer, having a refractive index of at least 0.10 less than the high refractive index layer, wherein the high refractive index layer comprises at least 60 wt-% of inorganic nanoparticles having a refractive index of at least 1.60 dispersed in the reaction product of a polymerizable resin composition comprising at least one di(meth)acrylate monomer or oligomer comprising at least two aromatic rings in an amount of at least 11 wt-% solids.

22. The antireflective film of claim 21 wherein the monomer has the structure:

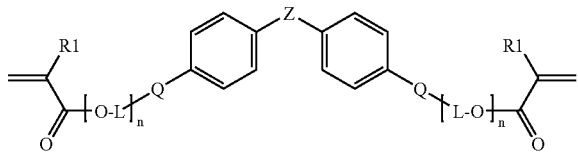

wherein Z is independently —C(CH$_3$)$_2$—, —CH$_2$—, —C(O)—, —S—, —S(O)—, or —S(O)$_2$—;
Q is independently O or S;
L is independently a branched or linear C$_2$-C$_{12}$ alkylene group;
n ranges from 1 to 10; and
R1 is independently H or methyl.

23. The antireflective film of claim 22 wherein n ranges from 1 to 3 and L is a branched or linear C$_2$-C$_6$ alkylene group.

24. The antireflective film of claim 21 wherein the monomer has the structure:

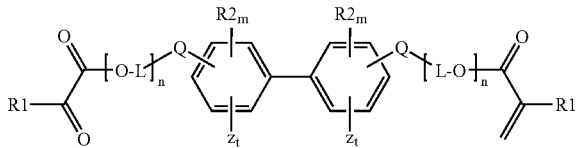

wherein each R1 is independently H or methyl;
each R2 is independently Br;
m ranges from 0 to 4;
each Q is independently O or S;
n ranges from 0 to 10;
L is independently a branched or linear C$_2$-C$_{12}$ alkylene group,
z is an aromatic ring; and
t is independently 0 or 1.

25. The antireflective film of claim 24 wherein n ranges from 1 to 3 and L is a branched or linear C$_2$-C$_6$ alkylene group.

26. The antireflective film of claim 21 wherein the polymerizable resin composition further comprises at least one crosslinker having at least three polymerizable (meth)acrylate groups.

27. An antireflective film comprising
a high refractive index layer, having a refractive index of at least about 1.60, coupled to a low refractive index surface layer, having a refractive index of at least 0.10 less than the high refractive index layer, wherein the high refractive index layer comprises at least 60 wt-% of inorganic nanoparticles having a refractive index of at least 1.60 dispersed in a crosslinked organic material and the inorganic nanoparticles comprise a first surface treatment that copolymerizes with the organic material, a second surface treatment having a non-reactive compatibilizing group, and the first surface treatment and second surface treatment are present at a molar ratio of at least 5:1.

28. The antireflective film of claim 27 wherein the organic material consists of one or more crosslinkers having at least three polymerizable (meth)acrylate groups.

* * * * *

UNITED STATES PATENT AND TRADEMARK OFFICE
CERTIFICATE OF CORRECTION

PATENT NO. : 8,343,622 B2
APPLICATION NO. : 12/165765
DATED : January 1, 2013
INVENTOR(S) : Lan H. Liu It is certified that error appears in the above-identified patent and that said Letters Patent is hereby corrected as shown below:

In the Specifications:

Column 4
Line 25, Delete "biphenol" and insert -- bisphenol --, therefor.
Line 45, Delete "novolak" and insert -- novolac --, therefor.

Column 6
Line 24, Delete "(meth)acryloy" and insert -- (meth)acryloyl --, therefor.

Column 7
Line 10, Delete "—O—S—," and insert -- —O— —S—, --, therefor.
Line 49, Delete "miscroscopy" and insert -- microscopy --, therefor.

Column 8
Line 32, Delete "Collodial" and insert -- Colloidal --, therefor.
Line 42, Delete "CAB-" and insert -- "CAB- --, therefor.

Column 9
Line 37, Delete "—NHC(0)X—" and insert -- —NHC(O)X— --, therefor.
Line 43, Delete "perflluropolyether" and insert -- perfluoropolyether --, therefor.

Column 10
Line 9, Delete "$CF_2T_2$," and insert -- $CF_2I_2$, --, therefor.

Column 11
Line 47, Delete "examplel," and insert -- example --, therefor.

Signed and Sealed this
Twenty-first Day of May, 2013

Teresa Stanek Rea
*Acting Director of the United States Patent and Trademark Office*

Column 16
Line 22, Delete "tubes" and insert -- diodes --, therefor.

Column 18
Line 13, Delete "Alpha" and insert -- Alfa --, therefor.

Column 20
Line 25, Delete "(10 g" and insert -- (100 g --, therefor.

Column 21
Line 2, Delete "Modifed" and insert -- Modified --, therefor.

In the Claims:

Column 26
Line 49, In Claim 19, after "product" insert -- of --.